United States Patent [19]

Blandy et al.

[11] Patent Number: 5,896,538

[45] Date of Patent: Apr. 20, 1999

[54] SYSTEM AND METHOD FOR MULTI-PHASED PERFORMANCE PROFILING OF SINGLE-PROCESSOR AND MULTI-PROCESSOR SYSTEMS

[75] Inventors: Geoffrey Owen Blandy, Austin; Maher Afif Saba, Round Rock; Robert John Urquhart, Austin, all of Tex.

[73] Assignee: International Business Machines Corporation, Armonk, N.Y.

[21] Appl. No.: 08/753,570

[22] Filed: Nov. 26, 1996

[51] Int. Cl.$^6$ ........................................ G06F 9/45
[52] U.S. Cl. ........................................ 395/704
[58] Field of Search .................. 395/704, 500, 395/183.14, 100, 183.15

[56] References Cited

U.S. PATENT DOCUMENTS

| | | | |
|---|---|---|---|
| 4,899,275 | 2/1990 | Sachs et al. | 711/3 |
| 5,047,919 | 9/1991 | Sterling et al. | 364/200 |
| 5,274,776 | 12/1993 | Senta | 395/570 |
| 5,392,408 | 2/1995 | Fitch | 711/202 |
| 5,457,799 | 10/1995 | Srivastava | 395/709 |
| 5,515,519 | 5/1996 | Yoshioka et al. | 395/581 |
| 5,539,907 | 7/1996 | Srivastava et al. | 395/700 |
| 5,748,878 | 5/1998 | Rees et al. | 395/183.4 |

*Primary Examiner*—Tariq R. Hafiz
*Assistant Examiner*—Peter J. Corcoran, III
*Attorney, Agent, or Firm*—Leslie A. Van Leeuwen; Jeffrey S. LaBaw; George E. Clark

[57] ABSTRACT

The present invention is directed to a system and method for monitoring system performance by using a multi-phase approach. The first phase, referred to as the burst counting phase, utilizes a set of counters to identify calls and returns which are heavily used. In the second phase, referred to as the instrumentation phase, the performance characteristics of the "hot spots" are monitored through the use of hardware counters. In a symmetrical multi-processor embodiment, the performance profiler is active on all processors at the same time. Frequently executed code paths are identified in a manner that is minimally-intrusive to the system as a whole, and uses relatively little storage. The user may specify a threshold count, after which hardware monitoring begins, and the user may specify the type of hardware performance data collected. After both phases of the performance monitor are run, the data can be presented to the user in a variety of ways.

18 Claims, 11 Drawing Sheets

SAMPLE OUTPUT
==============

PROCESSOR: 0

| MODULE NAME | # OF CALLS(% OF CALLS) | CPI | I/DCM | I/ICM | I/DTM | I/ITM |
|---|---|---|---|---|---|---|
| XSENDPACKET | 40365(12) | 5.3 | 3.3 | 28.2 | 490.1 | 102.3 |
| XRECVPACKET | 40212(6) | 1.4 | 24.2 | 32 | 408 | 304 |
| XMONITOR | 30324(4) | 0.7 | 696 | 90 | 114K | 52K |
| ... | | | | | | |

PROCESSOR: 1

| MODULE NAME | # OF CALLS(% OF CALLS) | CPI | I/DCM | I/ICM | I/DTM | I/ITM |
|---|---|---|---|---|---|---|
| XMONITOR | 330(5) | 0.9 | 801 | 120 | 103K | 49K |
| ... | | | | | | |

SUMMARY
=======

| SPACE | CPI | I/DCM | I/ICM | I/DTM | I/ITM |
|---|---|---|---|---|---|
| USER (RING 3) | 1.08 | 322 | 137 | 540K | 107K |
| KERNEL (RING 0) | 1.85 | 22 | 23 | 102 | 196 |

I    = INSTRUCTIONS
CPI  = CYCLES PER INSTRUCTION
DCM  = DATA CACHE MISS
ICM  = INSTRUCTION CACHE MISS
DTM  = DATA TLB MISS
ITM  = INSTRUCTION TLB MISS

SYSTEM AND METHOD FOR MULTI-PHASED PERFORMANCE PROFILING OF SINGLE-PROCESSOR AND MULTI-PROCESSOR SYSTEMS

BACKGROUND OF THE INVENTION

1. Field of the Invention

The present invention relates to information processing systems and, more particularly, to tools and methods for monitoring, modeling, and enhancing system performance.

2. Description of Related Art

To enhance system performance, it is helpful to know which modules within a system are the most frequently executed. These most frequently executed modules are referred to as "hot" modules. Within these hot modules, it is also useful to know which lines of code are the most frequently executed. These frequently executed code segments are known as "hot spots."

A programmer hoping to improve system performance should focus his or her efforts on improving the performance of the hot modules and hot spots within those modules. Improving the performance of the most frequently executed modules and code segments will have the most effect on improving overall system performance. It does not make sense to spend much time improving the performance of modules or code segments which are rarely executed, as this will have little, if any, effect on the overall system performance.

Many modern processors contain hardware capability which allows performance data to be collected. For example, most modern processors have the capability to measure cycle time. Many modern processors also have the ability to count other items, such as cache misses, floating point operations, bus utilization, and translation look-aside buffer (TLB) misses. To count cache misses, for example, a bit or a sequence of bits within a status register is set to a predetermined code. This bit sequence tells the processor to increment a counter every time there is a cache miss. When the bit sequence is reset, the processor stops counting cache misses, and the total number of cache misses can be read from another register or from a memory area.

Prior art approaches to collecting hardware performance data have focused on collecting this data for a specified period of time. However, data collected in this way is not very useful. For example, knowing that there were 50,000 cache misses during a particular time period does not tell a programmer where to focus his or her efforts to improve this statistic. Knowing that a particular operation takes a certain amount of cycle time is also not very helpful without knowing the cycles per instruction of each of the hot modules within the system.

Consequently, there is a need for a method and tool for identifying the most frequently executed code segments within a software system, and then collecting useful hardware performance data regarding these particular code segments in a non-intrusive manner.

SUMMARY OF THE INVENTION

Accordingly, the present invention is directed to a system and method for monitoring system performance by using a multi-phase approach. The first phase utilizes a set of counters to identify calls and returns which are heavily used. Thus, the repetitively invoked modules, or "hot spots," within a system are identified. In the second, or hardware phase, rather than counting calls to modules, the performance characteristics of the "hot spots" are monitored through the use of hardware counters.

In a symmetrical multi-processor embodiment, the performance profiler is active on all processors at the same time. Each processor has its own dynamic tree structure so that during phase one the particular instructions executing in different processors may be counted, with no serialization scheme necessary for memory access. A user may specify when counting should stop and hardware performance profiling should begin. A user may also specify the particular hardware performance data to be collected. After both phases of the performance monitor are run, the data can be presented to the user in a variety of ways.

It is an advantage of the present invention that the most frequently executed code paths are identified in a manner that is minimally-intrusive to the system as a whole, and uses relatively little storage. It is another advantage of the present invention that the user may specify a threshold count, after which hardware monitoring begins, and that the user may specify the type of hardware performance data collected. It is a further advantage of the present invention that hardware performance information is gathered pertaining to the code paths in which the user is most interested rather than to the entire system.

DETAILED DESCRIPTION OF A PREFERRED EMBODIMENT OF THE INVENTION

Figure 1:
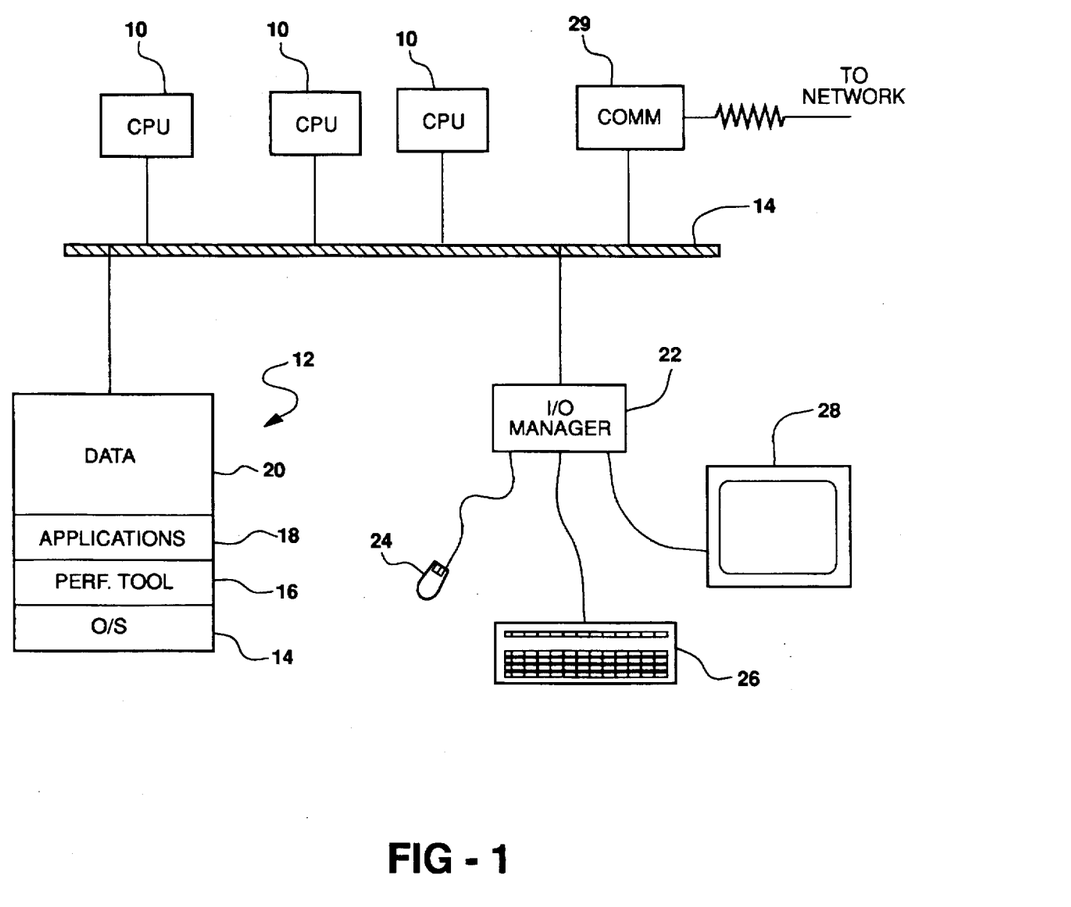
FIG. 1 is a block diagram of an information processing system capable of executing the performance monitoring tool of the present invention.

FIG. 1 is a block diagram of an information handling system embodying the present invention. As shown in FIG.

1, the system includes one or more processors 10, with hardware monitoring capability (not shown in drawing). There may be one processor that receives and handles all timer interrupts, or all processors may receive timer interrupts directly. The processors 10 are coupled to system memory 12 via a system bus 14. The system memory 12 consists of random access memory (RAM) which stores the operating system 14, the performance monitoring tool 16, application programs which are executing 18, and associated data 20. The data 20 consists of system data, application program data, and performance monitoring data. The processors are also connected via the bus 14 to a communication adapter 29 for connecting the information handling system to a data processing network, and an input/output (I/O) manager 22. Also connected to the I/O manager 22 are user input devices, such as a mouse 24 and a keyboard 26, and an output device, such as a display 28 which is used by the system to display user input and system output.

The present invention samples, or monitors, programs as they are executing. The programs being monitored may be of any type, including but not limited to operating system programs, kernel programs, utility programs, and application programs. There are two monitoring phases associated with the present invention. During phase one, also referred to as the burst counting phase, the performance monitor keeps a count of the number of times each module within the system executes. By counting CALL and RETURN instructions, the performance monitor identifies the hot modules within the system. After a module has been called a certain number of times, as defined by the user, hardware performance monitoring is enabled. Alternately, the performance monitor may wait until a certain number of modules, also defined by the user, have all been called a certain number of times, and then may initiate hardware performance monitoring for all of the modules simultaneously.

During phase two, also referred to as the instrumentation phase, the performance monitor utilizes hardware performance counters. For example, the performance monitor may track the cycle time for a module, or the number of cache misses in a module. This is useful data that can not be obtained solely by phase one, as phase one only counts the number of times each module is called. Phase two information can be used to calculate cycles per instruction, cache misses per module, and many other useful statistics. During phase two, each module executes with minimal intrusion due to a performance monitor. This phase two data can be presented to the user in a variety of ways.

During phase one, the system is monitored by sampling instructions in burst mode. Rather than monitoring every instruction, performance monitoring is activated to monitor a small group, or burst, of instructions. This certain number, or burst, of instructions is monitored during a burst interval. The performance monitor preferably keeps a count of each CALL instruction through the use of a modified radix tree, as described below with reference to FIG. 6. In this preferred embodiment, the performance monitor does not log the entire CALL instruction, or even the entire address of the CALL instruction, as this would use a large amount of memory. Rather, the performance monitor keeps count of CALL instructions as they are executed, and stores these counts in the radix tree.

Figure 2:
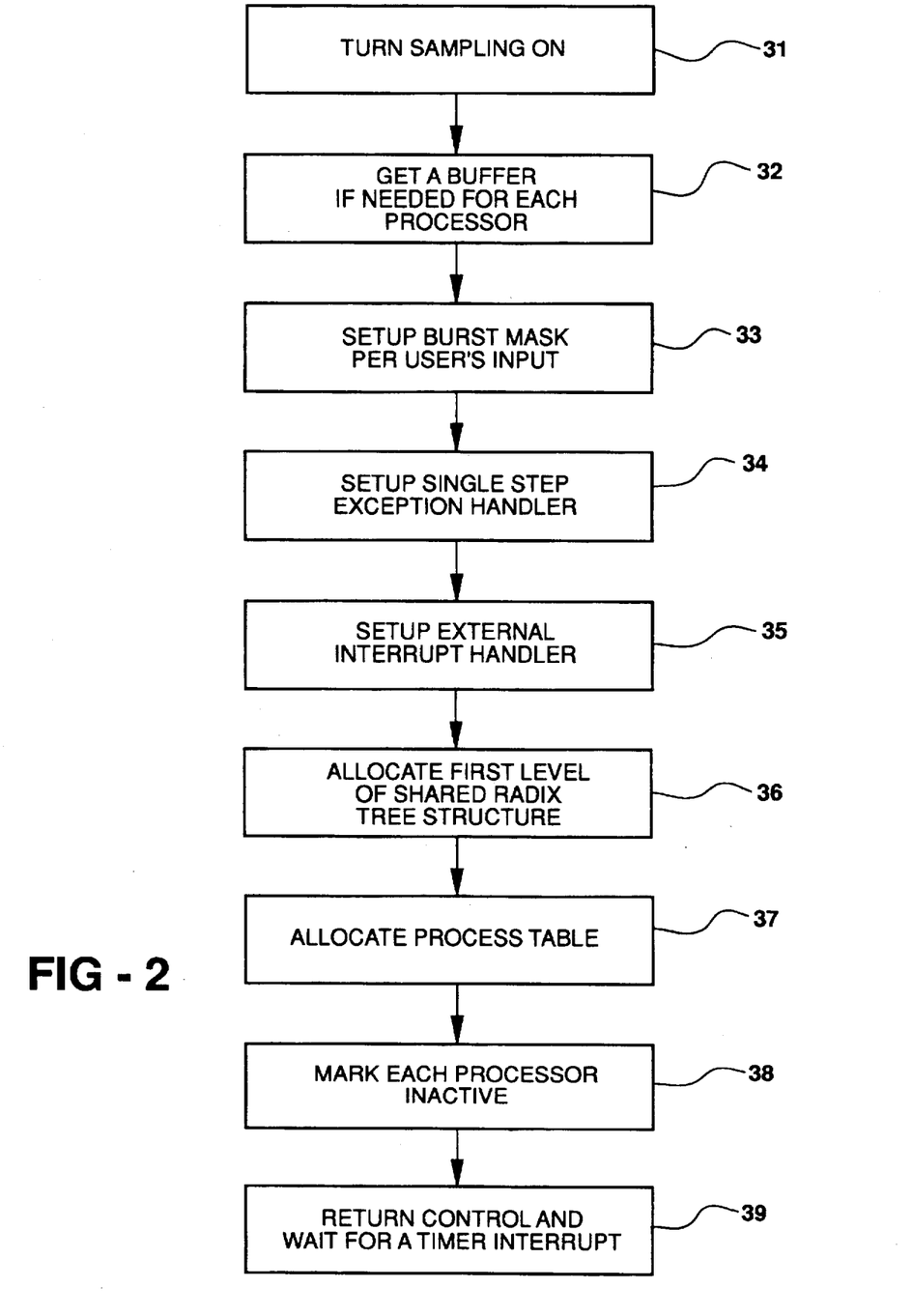
FIG. 2 is a flow chart illustrating how phase one performance monitoring is enabled according to the present invention.

FIG. 2 is a flow chart illustrating how phase one performance monitoring is initiated. Once a user decides to turn sampling on (step 31), the system obtains a buffer for each processor (step 32). Performance data for each processor is stored in that processor's buffer area. Separate buffers also eliminate the need for a locking system, or serialization of memory, in the performance monitor. No processor has to wait to write its performance data to a shared buffer, thus eliminating inaccuracies due to additional wait time (which would not be present during normal processing) being added to a processor's performance data. In addition, adverse hardware effects, such as cross-invalidation, are eliminated by the use of separate memory areas.

A burst mask is then provided (step 33). In the preferred embodiment of the present invention, the burst mask is implemented as a 32-bit number. Each group of four bits represents one interval, where an interval is a number of instructions to be monitored. A burst, or performance monitoring, interval begins when a performance timer interrupt occurs. A number from zero to fifteen may be entered for each interval, and represents the number of instructions (in thousands) to be executed during that interval. This is explained more fully in FIG. 3.

The performance monitor begins counting CALL instructions at the beginning of a burst interval (i.e. when a performance timer interrupt occurs), and stops counting when the burst count for the interval is reached or when a particular CALL instruction has been executed a certain number of times (thus causing the burst counting phase to end and the instrumentation phase to begin). Note that while only CALL instructions are counted, the burst count is decremented after each instruction executes. An entry of zero for a particular interval indicates that the performance monitor is idle during that interval, and thus does not count instructions for that interval. When a performance timer interrupt occurs, the performance monitor will use the next four bits of the burst mask to determine the number of instructions to be executed during that interval. However, if the next four bits are all zeros, this indicates that the performance monitor should not do anything, and should wait until the next performance timer interrupt occurs to check the next four bits of the burst mask. For example, an interval mask of 40201010 (hexadecimal) would tell the performance monitor to count CALL instructions during 4000 instructions in the first interval, remain idle for the second interval, count CALL instructions during two thousand instructions in the next interval, and so on.

The single step execution handler and external interrupt handler are then set up (steps 34 and 35). More details regarding the operation of the single step execution handler and external interrupt handler are given in FIGS. 3 and 4. The first level of a shared radix tree structure is allocated (step 36). Every processor in the system has at least a level 0 shared table. The shared table is where data regarding shared code will be stored. Many of the instructions in a system are part of what is referred to as shared code. This is usually kernel or operating system code that is used by other programs. Shared code is loaded into one linear virtual address space. More details regarding the structure of the radix tree and the method used to "walk the tree" are given in FIGS. 6 and 7.

A process table is also allocated for each processor (step 37). When a processor encounters a new process during performance monitoring (a process which is not part of the shared code), a process ID (PID) and address of a new level 0 table (i.e. a new radix tree structure for that process) will be entered into the processor's process table.

Each processor is marked inactive (step 38), which means that the burst count for the processor is set to zero. This keeps a processor from inadvertently storing data in the performance tables before monitoring actually starts. The performance monitoring tool is thus enabled, and is waiting for a timer interrupt (step 39) to initiate performance monitoring.

Figure 3:
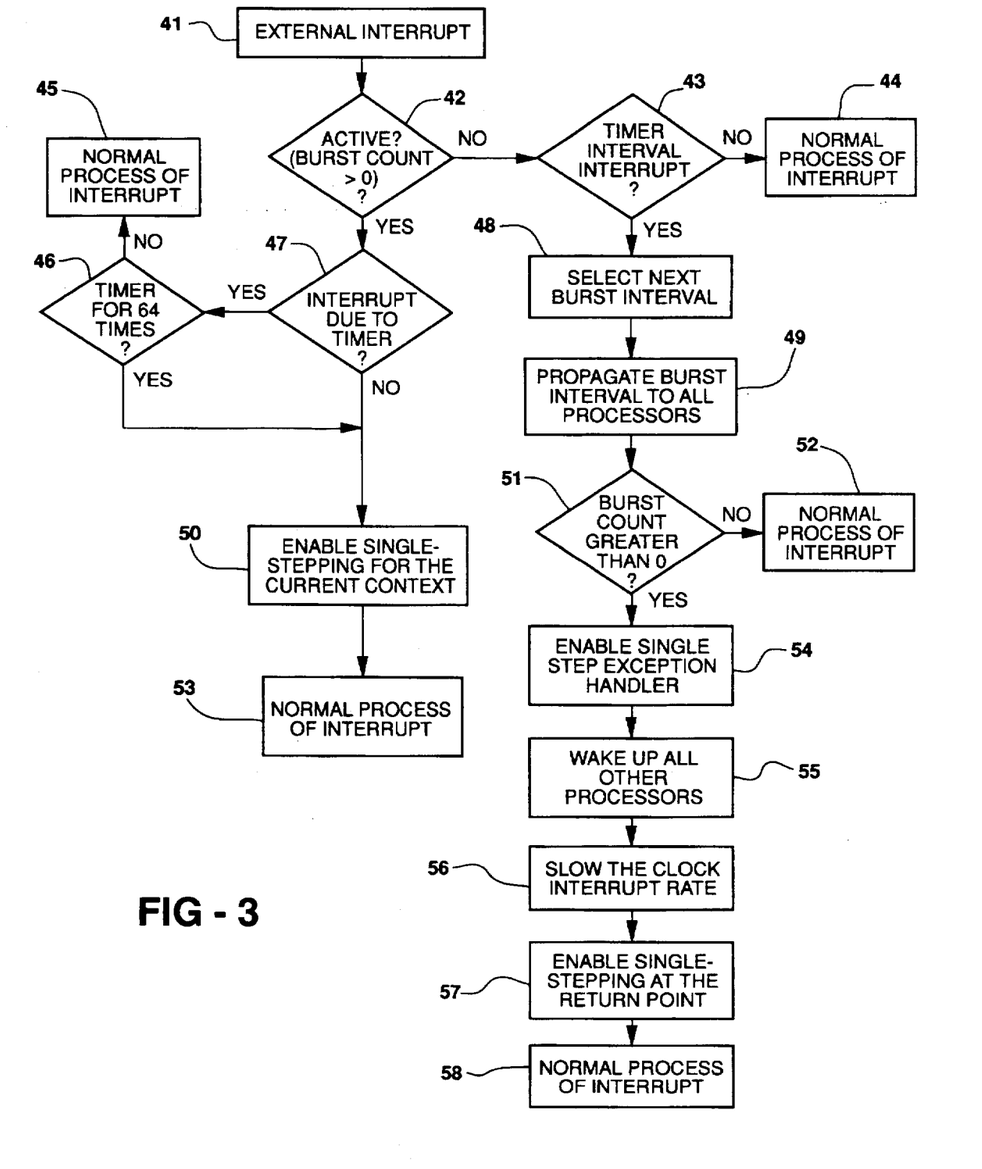
FIG. 3 is a flow chart illustrating the method of handling external interrupts during phase one, according to the present invention.

FIG. 3 is a flow chart illustrating the events that take place when an external interrupt (step 41) occurs. Note that in the described embodiment of the present invention, there are two timers, a programmable system timer, and a performance timer specifically dedicated to the performance monitor. The present invention could also be implemented in a system with only one timer. When a timer interrupt occurred, a variable could be checked to determine which type of timer interrupt had occurred.

When an external interrupt occurs (step 41), if the performance monitor is not active (step 42) and this is not a performance timer interrupt (step 43), then normal interrupt processing takes place (step 44). However, if the performance monitor is not active (step 42), but this is a performance timer interrupt (step 43), the next burst interval is set up to begin a burst counting phase. The next four bits from the interval mask are used to determine the number of instructions to be executed during this interval (step 48), and this number is propagated to all processors (step 49). If this number happens to be zero (step 51), this means the performance monitor is idle for this interval, and therefore normal interrupt processing takes place (step 52).

If the burst count is greater than zero (step 51), the single step exception handler is enabled (step 54). In the described embodiment of the invention, only one processor receives timer interrupts, and therefore this processor must wake up all other processors (step 55), and the other processors must then enable their single-stepping. In an alternate embodiment, all processors would receive the timer interrupts, and thus step 55 would not be necessary.

Next, the system clock, or system timer interrupt rate is "slowed" for the system (step 56). There are several ways that this can be accomplished. One method is to actually reprogram the system clock to interrupt less frequently, that is to wait a longer time between system timer interrupts. Another method is to allow the system timer interrupts to occur as normal, but to have an interrupt handler that ignores the timer interrupts until a predetermined number have occurred. Note that the system clock is not slowed. The system runs at normal functional speeds. The system timer simply interrupts the system less frequently than it normally would. The reason for this is that, although this method of performance monitoring is relatively non-intrusive, it still takes time to add the instruction counts into the radix tree structure. Slowing the rate of system timer interrupts simply takes this additional time into account and prevents the timer interrupt from constantly occurring while the system is being monitored.

In the described embodiment, when an external interrupt occurs during normal processing, single-stepping may be disabled. In this case, single-stepping must be re-enabled at the interrupt return point (step 57) before normal interrupt processing continues (step 58).

If the external interrupt occurs (step 41) and the performance monitor is already active (step 42), the next step is to determine whether the external interrupt is a performance timer interrupt (step 47). If so, and the performance timer has not interrupted for a pre-determined number of times (step 46), then normal interrupt processing takes place (step 45). If the interrupt is not a performance timer interrupt (step 47), or the performance timer has interrupted for the pre-determined number of times, then single stepping is enabled for the current context (step 50), and normal interrupt processing occurs (step 53).

Figure 4:
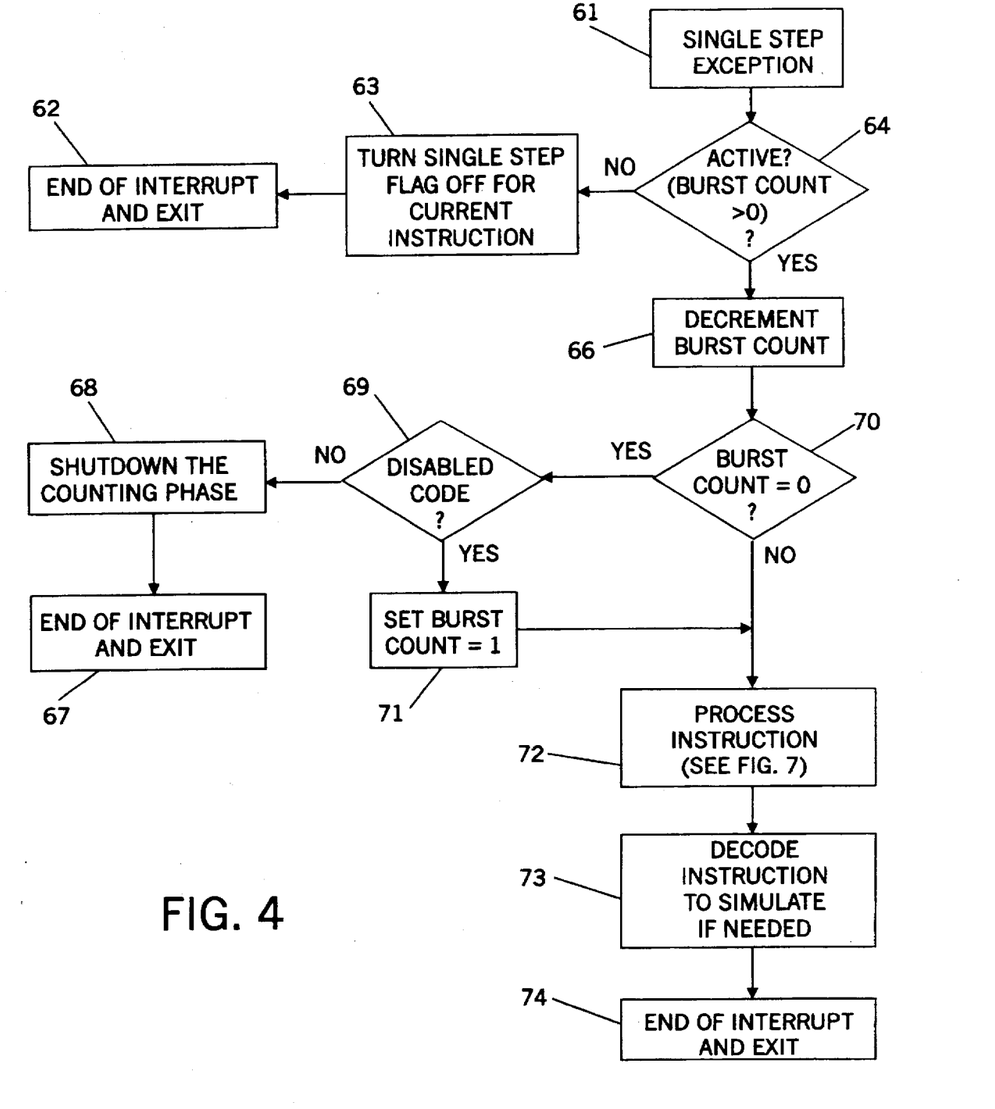
FIG. 4 is flow chart illustrating the method of single step execution during phase one, according to the present invention.

FIG. 4 is a flow chart illustrating the events that take place when a single step exception (step 61) occurs. If the performance monitor is not active (step 64), then the single step flag is turned off for the current instruction (step 63) and the interrupt ends (step 62).

If, however, the performance monitor is active (step 64), then the burst count is decremented (step 66). The next step is to determine if the burst counter is equal to zero (step 70). If it is, a determination must be made as to whether the burst counting phase should be stopped for this interval (steps 68 and 67), or whether the burst count should be forced to remain at one (step 71), so that the performance monitor continues the burst counting phase.

This determination is made by looking at whether the code currently being executed is "disabled for interrupt" code (step 69). Disabled for interrupt code is code that does not get interrupted while executing. This means that performance monitoring can never begin during a disabled for interrupt portion of code. Therefore, if a disabled for interrupt section of code is larger than the burst interval, there may be code that is never monitored. To avoid this situation, if the burst count is reached while disabled for interrupt code is executing, the burst count is forced to be one (step 71), and monitoring continues until the disabled code section is complete. This ensures that even code within a large disabled for interrupt code section will be monitored.

Figure 7A:
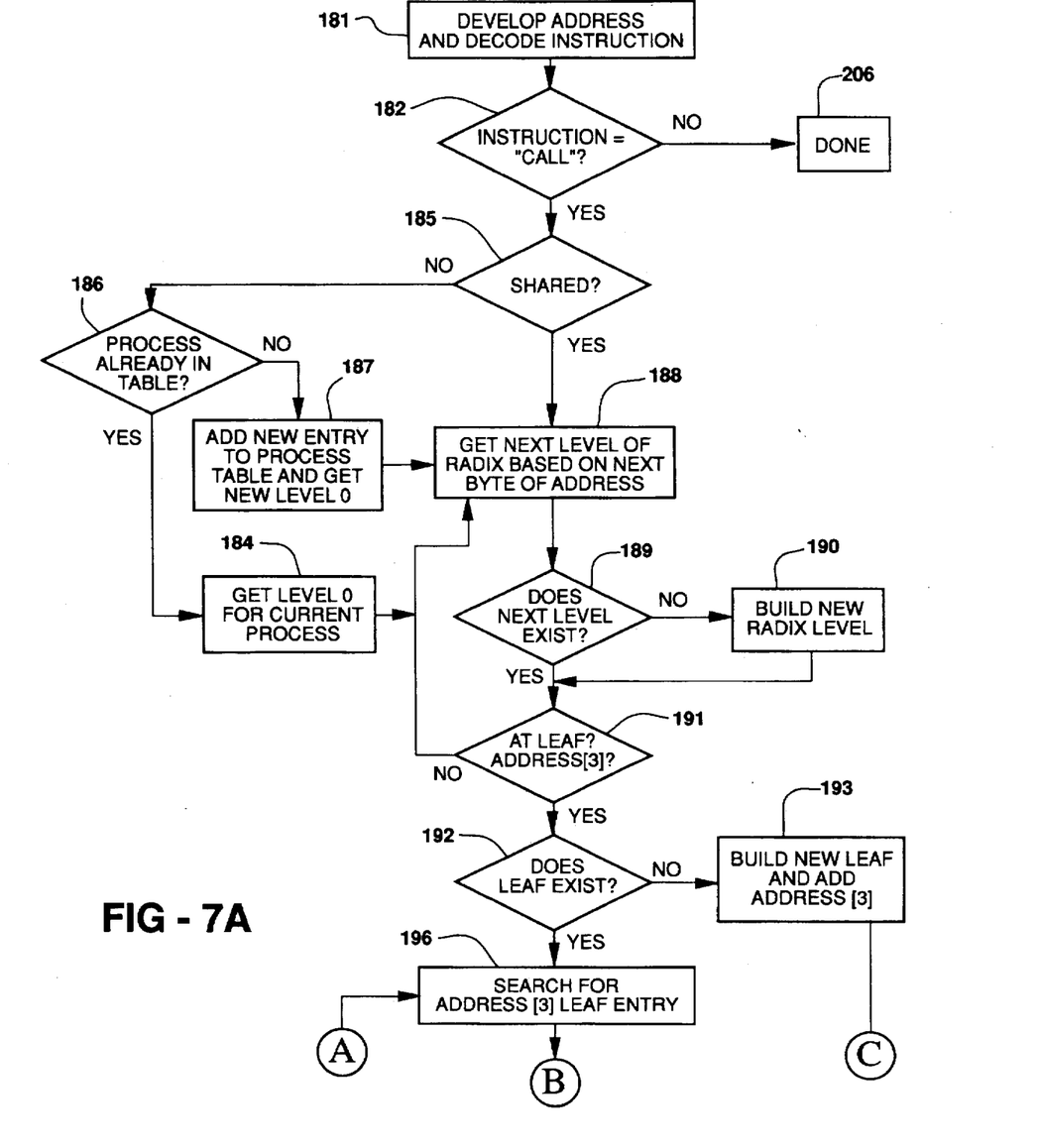
FIGS. 7A and 7B are flow charts illustrating the method of storing performance data in a radix tree during phase one, according to the present invention.
Figure 7B:
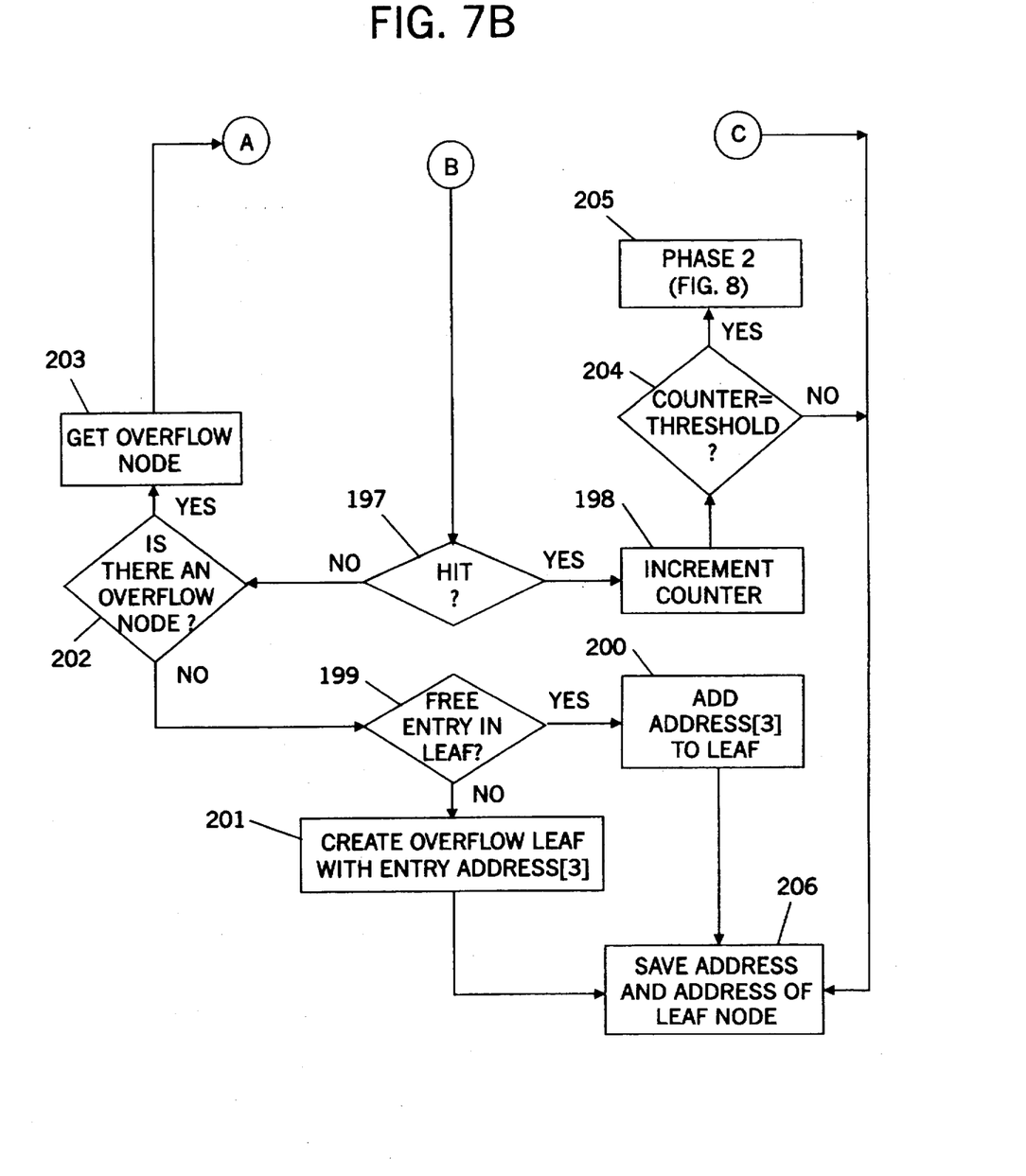

If performance monitoring continues (either from step 70 or step 71), the instruction is processed (step 72) and added to the instruction count. Further details of this step are given in FIG. 7. Because some instructions actually cause single stepping to be turned off, each instruction is decoded to see if it is one of these instructions, and if so, single stepping is turned back on (step 73).

Figure 5:
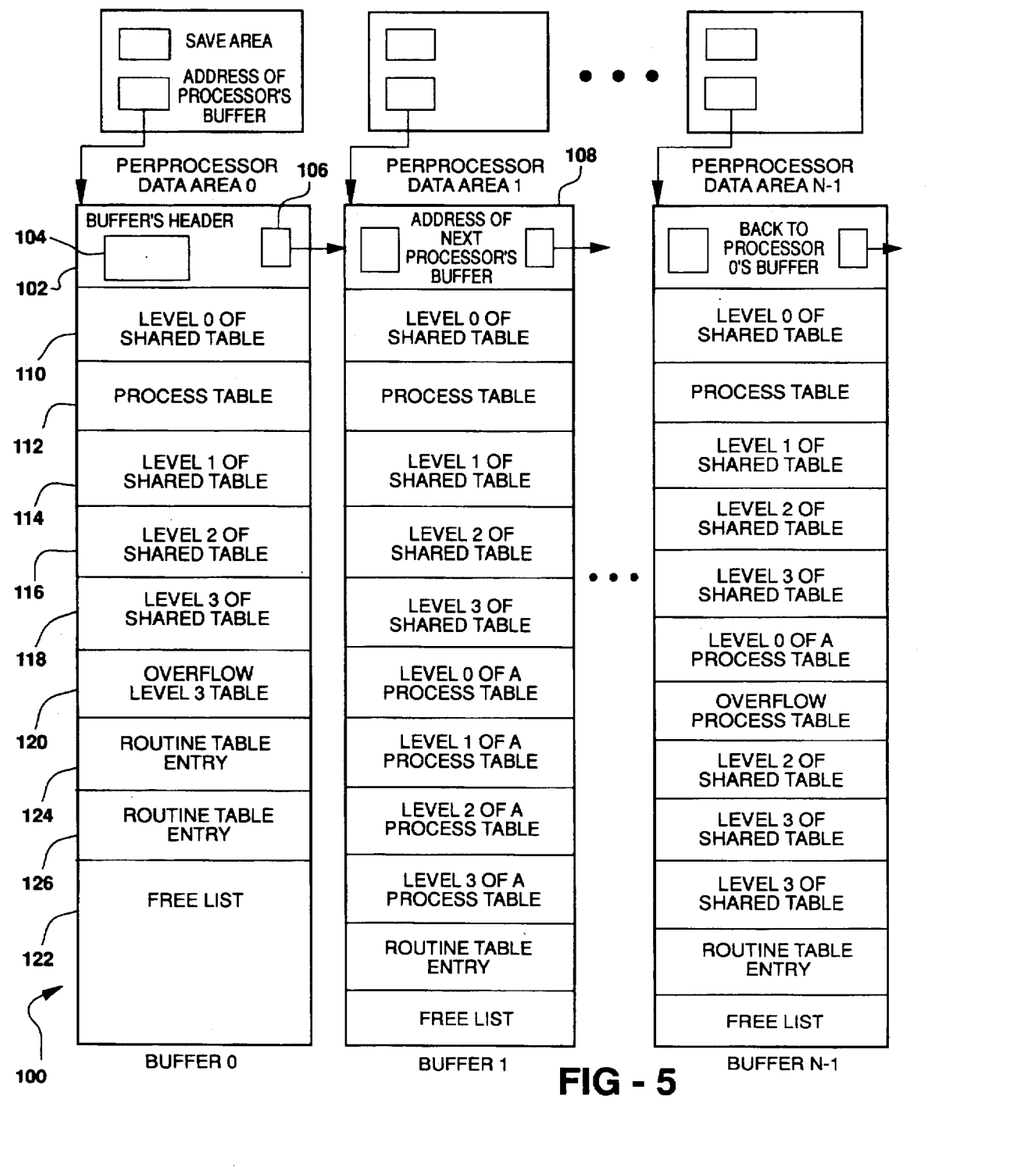
FIG. 5 is a block diagram of the data structures used for storing performance information according to the present invention.
Figure 6:
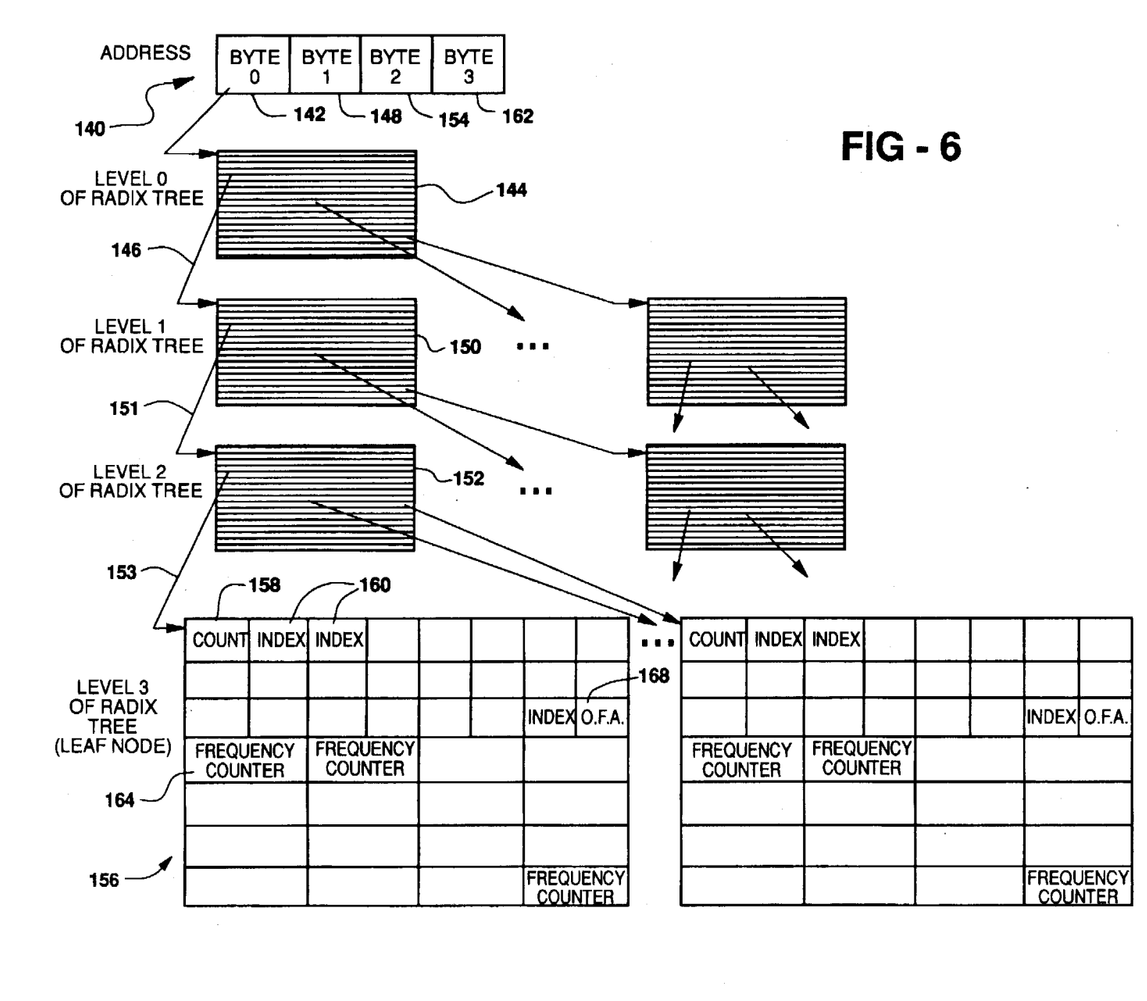
FIG. 6 is a block diagram of the modified radix tree structure according to the present invention.

FIG. 5 depicts the data structure used to store the performance data for each processor. As shown in FIG. 5, each processor has a buffer area in which performance data is stored. If there are n processors in a system, there are n buffers numbered from 0 to n-1. For example, buffer zero 100 is the buffer area reserved for the first processor in FIG. 5. In buffer zero's header area 102, the current burst count 104 is stored, along with a pointer 106 to buffer one's header 108. Each buffer contains a level zero of shared table 110 and a process table 112. In this example, buffer zero 100 also contains a level one of shared table 114, a level two of shared table 116, a level three of shared table 118, and an overflow level three table 120. Level zero 110, level one 114, level two 116, and level three 118 are actually implemented as levels zero, one, two, and three of a radix tree, with level three being a leaf node. The actual details of the radix tree implementation are shown in FIG. 6. There is also free space 122 which can be used as needed to create more tables. For example, if the performance monitor encounters a new process, a level 0 of a process table for that process will be allocated.

Figures 10A, 10B:
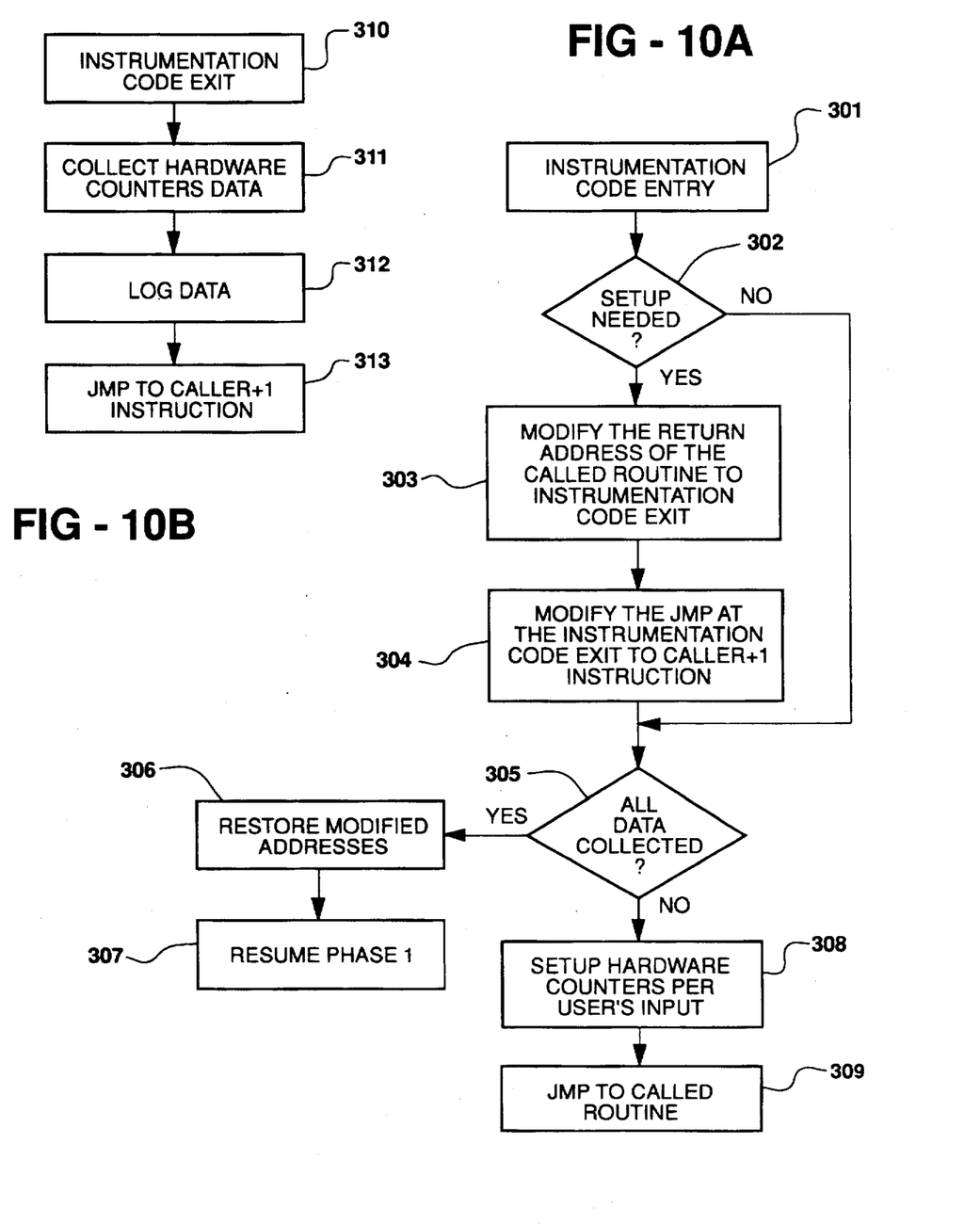
FIG. 10A is a flow chart illustrating the instrumentation code entry during phase two, according to the present invention.
FIG. 10B is a flow chart illustrating the instrumentation code exit during phase two, according to the present invention.
Figure 11:
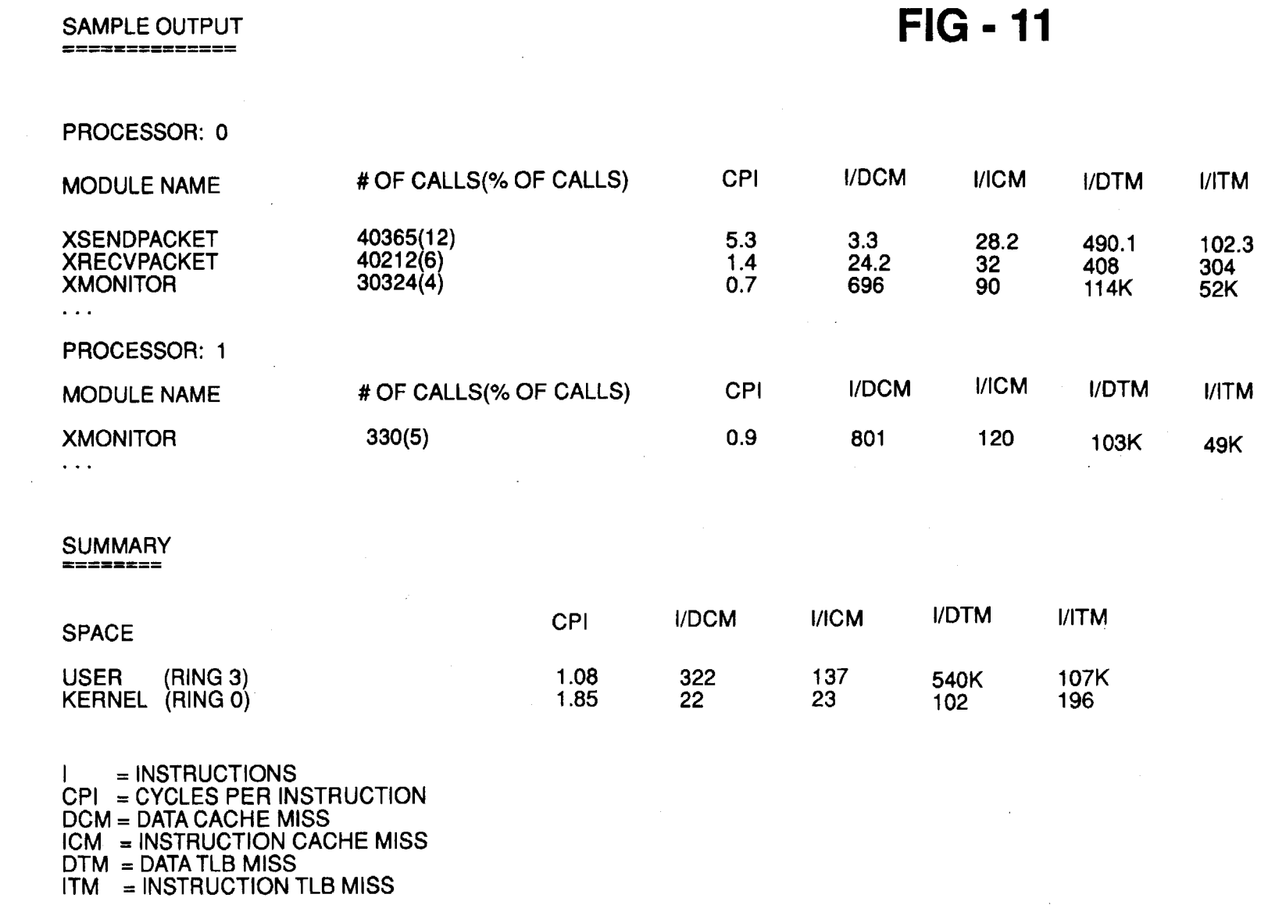
FIG. 11 is an example of typical output displayed by the present invention.

Each buffer also contains a routine table entry 124 for each hot module that is monitored during phase two. Note that in this example, buffer 0 contains two routine table entries 124, 126. The hardware performance data collected for each module is stored in a separate routine table entry 124, 126 as shown in FIG. 10. This hardware performance data may be presented to the user in a variety of ways, as shown in FIG. 11.

FIG. 6 is a block diagram of the modified radix tree structure of the present invention. When the performance monitor encounters a CALL instruction, it increments that CALL instruction's counter in the radix tree. To find the correct counter to increment, the CALL instruction's four-byte address 140 is used. Byte zero 142 is used as a displacement into level zero 144 of the radix tree. At that point in level zero, a pointer 146 is found which points to level one 150. Byte one 148 of the instruction is used as an index into the level one of radix tree 150. At that point in level one 150 there is a pointer 151 to level two of the radix tree 152. Byte two 154 is used as an index into level two 152. At that point in level two there is a pointer 153 to level three of the radix tree 156.

Level three of a radix tree 156 is also called a leaf node. Actual CALL instruction counts are preferably kept in a leaf node. A leaf node is set up as follows. The first entry, count 158, is the number of different CALL instructions for which data is stored in this leaf node. A count of zero means one instruction, a count of one means two instructions, and so on. After the count field 158, there are one or more index fields 160. In the described implementation, there are approximately ten to thirty index fields. The first index field 160 contains byte three 162 of the first CALL instruction encountered and tracked at this leaf node. A frequency counter 164 corresponds to index 160. The frequency counter 164 contains the number of times the CALL instruction has been encountered. A frequency of zero means the CALL instruction has been encountered once, a frequency of one means the CALL instruction has been encountered twice, and so on. Note that in the described embodiment, each leaf node covers a 256-byte address space. However, a leaf node could cover a larger or smaller address space.

The leaf node also contains an overflow anchor 168. The overflow anchor 168 is a pointer which points to an overflow table, which is a table created in the event that all indexes are used in a particular leaf node, and more storage is needed.

FIGS. 7A and 7B are flow charts illustrating the method used to walk the radix tree, store instruction counts, and determine when an instrumentation phase begins. During the burst counting phase, CALL instructions are counted for each module. When a module has been called a pre-determined number of times, an instrumentation phase begins. During the instrumentation phase, hardware performance data is collected for the particular module being monitored. Rather than collecting data for the entire system, hardware performance data is only collected for the "hot modules" identified during the burst counting phase.

Referring now to FIGS. 7A and 7B, the first step in walking the radix tree is to develop the 32-bit flat address of the instruction, and to decode the instruction (step 181). In some architectures, such as Intel architectures, this step will involve segment register calculations. In other architectures, this may be a much simpler step. If the instruction is not a CALL (step 182), the module ends (step 206), as only CALL instructions are counted. If the instruction is a CALL (step 182), then a determination is made as to whether the current instruction is in shared code (step 185). If not, either the level 0 table for the current process will be obtained (steps 186 and 184), or a new entry will be added to the process table and storage will be allocated for a level 0 table (steps 186 and 187).

The next step is to walk the tree until a leaf node is found for this instruction. The performance monitor uses each byte of the CALL instruction's address to get to the next level of the radix tree for the instruction (step 188). If the next level does not exist (step 189), a new radix level is built (step 190). This process is repeated until the final byte of the CALL instruction's address is reached (step 191). If a leaf node does not exist for this CALL instruction's address (step 192), a new leaf is added (step 193), and the CALL instruction's byte 3 is entered into the first index area of the new leaf node. The count field of the new leaf node remains zero (as discussed above, this means one instruction is in the leaf). The frequency counter for the instruction also remains zero (as this also means the instruction has been encountered once).

If the leaf node already exists (step 192), byte 3 of the current address must be located within the leaf node (step 196). If byte 3 is not found in the leaf node (step 197), the performance monitor will add the new entry to a free entry in the leaf (steps 199, 200, and 206), search any overflow nodes (steps 202 and 203), or, if necessary, create an overflow leaf (steps 201 and 206).

If however, byte 3 is found (step 197), the appropriate counter is incremented (step 198). When the counter is incremented (step 198), a check is made to determine if the counter has reached the pre-determined threshhold value for the called module (step 204). If so, phase two hardware monitoring is initiated (step 205). When phase two begins, the current phase one burst counting interval is ended, even if the total number of instructions counted during the interval has not reached the burst count for the interval.

Figures 8, 9:
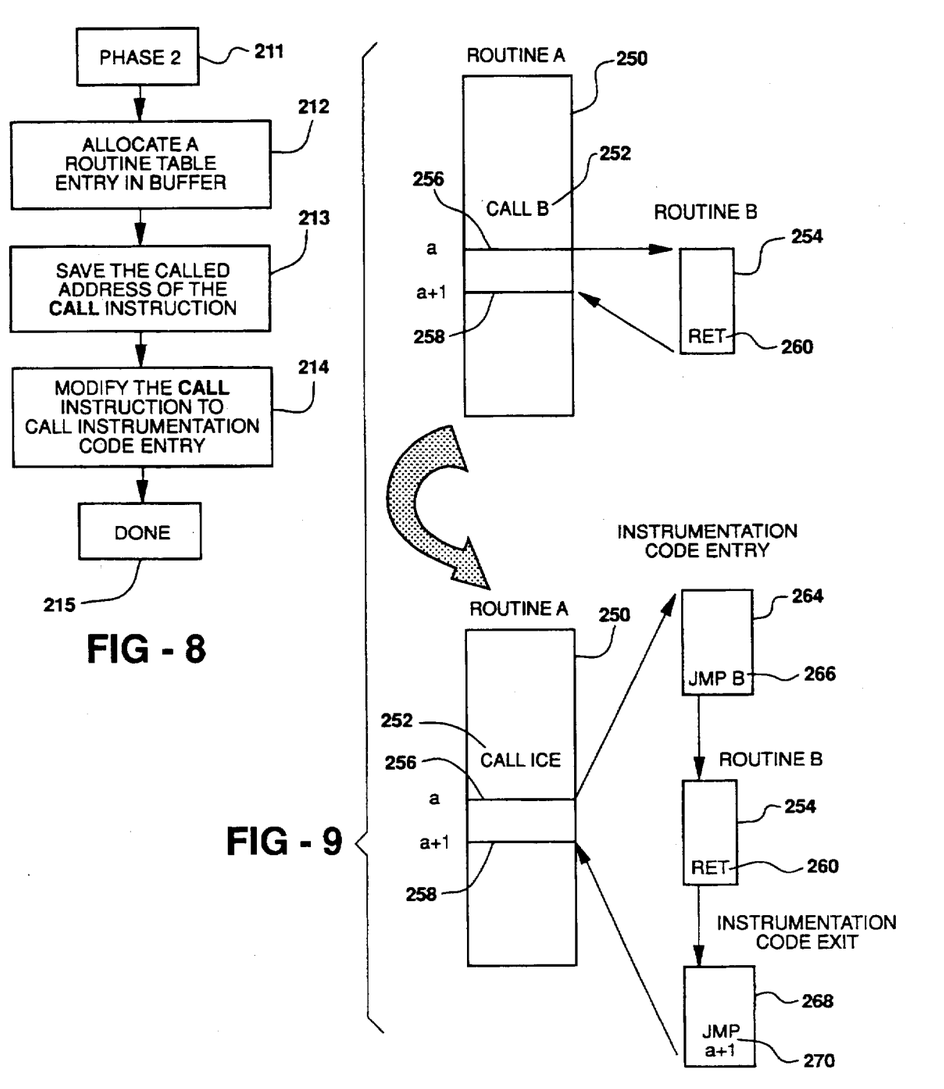
FIG. 8 is a flow chart illustrating how phase two performance monitoring is enabled according to the present invention.
FIG. 9 is a block diagram showing the instrumentation of routines during phase two, according to the present invention.

FIG. 8 is a flow chart illustrating how phase two hardware performance monitoring is enabled. When it is determined that phase two, the instrumentation phase, should begin (step 211), the performance monitor allocates a routine table entry in the current processor's buffer area (step 212). The buffer areas are shown in FIG. 5. The called address of the CALL instruction is saved (step 213), and the CALL instruction itself is modified to call an instrumentation code entry point instead (step 214). Phase two is thus enabled (step 215).

FIG. 9 is a block diagram illustrating the instrumentation of routines during phase two. Suppose, for example, that routine A 250 contains a CALL instruction 252 that calls routine B 254. CALL. instruction 252 is located at memory location "a" 256. When routine B ends its execution, it executes a RETURN instruction 260 which returns control to memory location "a+1" 258. When phase two performance monitoring is enabled, CALL instruction 252 is modified as shown to call an instrumentation code entry routine 264. After initiating hardware performance monitoring (as shown in FIG. 10A) e instrumentation code entry routine 264 executes a JUMP instruction 266 to routine B 254. Routine B 254 runs as normal, and then executes RETURN instruction 260. However, during phase two monitoring, RETURN instruction 260 gives control to an instrumentation code exit routine 268. Instrumentation code exit routine 268 collects and logs the data pertaining to routine B 254 (as shown in FIG. 10B), and then executes a JUMP instruction 270 which returns control to memory location "a+1" 258.

FIG. 10A is a flow chart illustrating the program flow of the instrumentation code entry routine. When the instrumentation code entry routine begins (step 301) the first check is to determine if setup is needed (step 302). Setup is necessary if this is the first time a particular module has been monitored during phase two. If setup is needed, the called routine's return address is modified to return to step 310 of the instrumentation code exit (shown in FIG. 10B) (step 303), and the JUMP at the end of the instrumentation code exit is modified to return to the instruction following the CALL instruction in the caller's code (step 304). After setup (or if setup is not needed), the next step is to determine if all data has been collected (step 305). A user may want to collect several different types of hardware data in phase two. The user specifies the hardware data to be collected before the performance monitor begins execution. The user may enter this information, along with other information, such as the burst mask, by typing a command, using a menu, or using any other method of inputting this data to the performance monitor. If there is still more hardware performance data to collect, the appropriate bits are set to initiate hardware data collection (step 308), and then the called routine is executed (step 309).

If all phase two hardware performance data has been collected (step 305), all modified addresses are restored (step 306), and then phase one begins again (step 307). Phase one will continue until the next module reaches the threshhold number of CALLs, and then phase two will be initiated for the next module. By switching back and forth between the burst counting phase (phase one) and the instrumentation phase (phase two), the present invention ensures that useful performance data is collected for the most frequently executed code segments, in this case modules, in the system.

FIG. 10B is a block diagram illustrating the program flow of the instrumentation code exit routine. The routine begins (step 310) and then collects all the hardware performance data that has been stored while the called module was executing (step 311). This data is logged in the appropriate processor's buffer (step 312), and then control is returned to the calling program (step 313).

After phase two ends, phase one begins again. At the next performance timer interrupt, the performance monitor obtains the next burst count from the burst mask and begins counting CALL instructions. Eventually, another module will reach a threshold level of CALL instructions, and then phase two performance monitoring will begin for this new module. Phase one and phase two will continue to execute in this manner until a predetermined number of modules have been monitored using phase two. The user specifies the number of hot modules to monitor in phase two before performance monitoring begins. This information can be specified along with the burst mask and the different types of hardware information to be collected.

FIG. 11 depicts typical output that may be viewed after running the performance monitor. Note that three modules in processor 0 (XSendPacket, XRecvPacket, and XMonitor) have been monitored during phase two. For each module, the number of calls to that module, the percentage of total calls, and particular hardware statistics are displayed. For example, XSendPacket was called 40,365 times, which was 12% of the total calls made. XSendPacket had an average of 5.3 cycles per instruction, 3.3 instructions per data cache miss, 28.2 instructions per instruction cache miss, 490.1 instructions per data TLB miss, and 102.3 instructions per instruction TLB miss. Similar data is presented for XRecvPacket and XMonitor. Data is also shown for one module, XMonitor, executed in Processor 1. In addition, summary statistics for the system as a whole are presented, and are broken out into user code and kernel code. This information can be used by a programmer to improve the performance of the system, in particular the hot modules which were monitored.

Although the invention has been described with a certain degree of particularity, it should be recognized that elements thereof may be altered by persons skilled in the art without departing from the spirit and scope of the invention. One of the preferred implementations of the invention is as sets of instructions resident in the system memory 12 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and. transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for monitoring system performance of an information handling system, comprising the steps of:

executing a burst counting phase, wherein said step of executing said burst counting phase includes the steps of:

executing a predetermined number of instructions;

storing a call count for one or more code segments, wherein the call count for a particular code segment is a number of times the particular code segment has executed; and selecting one or more of the code segments to be instrumented, wherein the call count for each selected code segment is at least equal to a predetermined threshold count;

automatically switching from said burst counting phase to an instrumentation phase when a predetermined number of code segments have been selected as the code segments to be instrumented;

executing said instrumentation phase for each of the selected code segments; and displaying, for each selected code segment, the call count and the data collected during said instrumentation phase, on a display device.

2. A method for monitoring system performance according to claim 1, further comprising the step of:

switching from said instrumentation phase to said burst counting phase when each selected code segment completes execution.

3. A method for monitoring system performance according to claim 1, further comprising the step of:

executing said instrumentation phase for each selected code segment, one after the other, before switching back to said burst counting phase.

4. A method for monitoring system performance according to claim 1, wherein the step of executing said instrumentation phase comprises the steps of:

selecting one or more hardware properties of a code segment to be monitored;

executing said code segment; and storing a property count.

5. A method for monitoring system performance according to claim 4, wherein the step of storing a property count comprises the step of storing a number of times said hardware property occurred while executing said code segment.

6. A method for monitoring system performance according to claim 4, wherein the step of storing a property count comprises the step of storing an amount of time during which said hardware property occurred while executing said code segment.

7. A system for monitoring performance of an information handling system, comprising:

one or more processors;

a storage area, for storing performance data;

an operating system for controlling the gathering and storing of said performance data by said one or more processors;

a display device, for viewing said performance data;

means for executing a burst counting phase, wherein said means for executing said burst counting phase includes:
  means for executing a predetermined number of instructions;
  means for storing a call count for one or more code segments, wherein the call count for a particular code segment is a number of times the particular code segment has executed; and
  means for selecting one or more of the code segments to be instrumented, wherein the call count for each selected code segment is at least equal to a predetermined threshold count;

means for automatically switching from said burst counting phase to an instrumentation phase when a predetermined number of code segments have been selected as the code segments to be instrumented;

means for executing said instrumentation phase for each of the selected code segments; and means for displaying, for each selected code segment, the call count and data collected during said instrumentation phase on said display device.

8. A system for monitoring performance according to claim 7, further comprising:
  means for switching from said instrumentation phase to said burst counting phase when each selected code segment completes execution.

9. A system for monitoring performance according to claim 7, further comprising:
  means for executing said instrumentation phase for each selected code segment, one after the other, before switching back to said burst counting phase.

10. A system for monitoring performance according to claim 7, wherein the means for executing said instrumentation phase comprises:
  means for selecting one or more hardware properties of a code segment to be monitored;
  means for executing said code segment; and
  means for storing a property count.

11. A system for monitoring performance according to claim 10, wherein the means for storing a property count comprises means for storing a number of times said hardware property occurred while executing said code segment.

12. A system for monitoring performance according to claim 10, wherein the means for storing a property count comprises means for storing an amount of time during which said hardware property occurred while executing said code segment.

13. A computer readable medium for monitoring performance of an information handling system, comprising:
  means for executing a burst counting phase, wherein said means for executing said burst counting phase includes:
    means for executing a predetermined number of instructions;
    means for storing a call count for one or more code segments, wherein the call count for a particular code segment is a number of times the particular code segment has executed; and
    means for selecting one or more of the code segments to be instrumented, wherein the call count for each selected code segment is at least equal to a predetermined threshold count;
  means for automatically switching from said burst counting phase to an instrumentation phase when a predetermined number of code segments have been selected as the code segments to be instrumented;
  means for executing said instrumentation phase for each of the selected code segments; and
  means for displaying, for each selected code segment, the call count and data collected during said instrumentation phase on a display device.

14. A computer-readable medium for monitoring performance according to claim 13, further comprising:
  means for switching from said instrumentation phase to said burst counting phase when each selected code segment completes execution.

15. A computer-readable medium for monitoring performance according to claim 13, further comprising:
  means for executing said instrumentation phase for each of the selected code segments, one after the other, before switching back to said burst counting phase.

16. A computer-readable medium for monitoring performance according to claim 13, wherein the means for executing said instrumentation phase comprises:
  means for selecting one or more hardware properties of a code segment to be monitored;
  means for executing said code segment; and
  means for storing a property count.

17. A computer-readable medium for monitoring performance according to claim 16, wherein the means for storing a property count comprises means for storing a number of times said hardware property occurred while executing said code segment.

18. A computer-readable medium for monitoring performance according to claim 16, wherein the means for storing a property count comprises means for storing an amount of time during which said hardware property occurred while executing said code segment.

* * * * *